US012650232B2

(12) United States Patent
Chartrel et al.

(10) Patent No.: US 12,650,232 B2
(45) Date of Patent: Jun. 9, 2026

(54) FUME EXTRACTION DEVICE, SYSTEM FOR INSTALLATION, AND ASSEMBLY KIT FOR A FUME EXTRACTION

(71) Applicant: BSH Hausgeräte GmbH, Munich (DE)

(72) Inventors: Aurélien Chartrel, Lingolsheim (FR); Laetitia Angelo, Schiltigheim (FR); Léa Leblanc, Strasbourg (FR); Gauthier Watrin, Colmar (FR); Marc Siefer, Marlenheim (FR); Florent Amyot, Erstein (FR)

(73) Assignee: BSH Hausgeräte GmbH, Munich (DE)

( * ) Notice: Subject to any disclaimer, the term of this patent is extended or adjusted under 35 U.S.C. 154(b) by 656 days.

(21) Appl. No.: 17/797,126

(22) PCT Filed: Jan. 27, 2021

(86) PCT No.: PCT/EP2021/051829

§ 371 (c)(1),
(2) Date: Aug. 3, 2022

(87) PCT Pub. No.: WO2021/160431

PCT Pub. Date: Aug. 19, 2021

(65) Prior Publication Data

US 2023/0056084 A1 Feb. 23, 2023

(30) Foreign Application Priority Data

Feb. 14, 2020 (EP) .................................... 20290012

(51) Int. Cl.
*F24C 15/20* (2006.01)
*G10K 11/162* (2006.01)

(52) U.S. Cl.
CPC ...... *F24C 15/2035* (2013.01); *F24C 15/2042* (2013.01); *G10K 11/162* (2013.01)

(58) Field of Classification Search
CPC .. F24C 15/2042; F24C 15/2035; B01D 39/20; B01D 39/2006; B01D 39/2017; G10K 11/162
USPC .......................................... 126/229 D, 299 R
See application file for complete search history.

(56) References Cited

U.S. PATENT DOCUMENTS 4,083,361 A * 4/1978 Bergmark ............... F04D 25/12 55/DIG. 36
4,610,705 A * 9/1986 Sarnosky ............ F24C 15/2035 96/135

(Continued)

FOREIGN PATENT DOCUMENTS

CN 103908866 A 7/2014
CN 204411971 U 6/2015

(Continued)

OTHER PUBLICATIONS

Machine Translation of 2002186813 (Year: 2002).*

(Continued)

*Primary Examiner* — Allen R. B. Schult
*Assistant Examiner* — Amy E Carter
(74) *Attorney, Agent, or Firm* — Michael E. Tschupp; Andre Pallapies; Brandon G. Braun

(57) ABSTRACT

A fume extraction device for installation in an item of kitchen furniture includes an air duct, a top side provided with an air inlet opening, an appliance housing arranged below the air inlet opening and having a side wall provided with an air outlet opening which is connected to the air duct, a fan arranged in the appliance housing, and a noise filter element received in the appliance housing and including a filter material which is chemically inert.

17 Claims, 5 Drawing Sheets

(56) References Cited

U.S. PATENT DOCUMENTS

| | | | | |
|---|---|---|---|---|
| 8,940,082 | B2 * | 1/2015 | Eich | B01D 46/10 96/152 |
| 11,285,421 | B2 * | 3/2022 | McKechnie | B01D 39/1676 |
| 2004/0083693 | A1 * | 5/2004 | Keller | F24C 15/2035 55/320 |
| 2006/0150965 | A1 | 7/2006 | Kim | |
| 2007/0062513 | A1 * | 3/2007 | Gagas | G01G 3/16 126/299 D |
| 2012/0204855 | A1 * | 8/2012 | Huber | F24C 15/2092 126/299 R |
| 2013/0233295 | A1 * | 9/2013 | Oagley | F24C 15/20 126/299 D |
| 2015/0083107 | A1 | 3/2015 | Busch | |
| 2019/0203949 | A1 * | 7/2019 | Könneker | F24C 15/2042 |
| 2021/0148580 | A1 * | 5/2021 | Bussotto | F24C 15/2042 |

FOREIGN PATENT DOCUMENTS

| | | | | |
|---|---|---|---|---|
| CN | 207137581 | U | 3/2018 | |
| DE | 29612204 | U1 | 11/1997 | |
| DE | 10112802 | A1 * | 9/2002 | F24C 15/2042 |
| DE | 202013100130 | U1 * | 4/2014 | F24C 15/20 |
| EP | 0499802 | B1 * | 10/1997 | F24C 15/20 |
| EP | 2554917 | B1 | 10/2019 | |
| ES | 2557458 | T3 * | 1/2016 | F24C 15/2035 |
| JP | 2002186813 | A * | 7/2002 | |
| JP | 2003311116 | A * | 11/2003 | |
| KR | 20050072194 | A * | 7/2005 | F24F 13/28 |
| WO | 2017080781 | A1 | 5/2017 | |
| WO | 2017103708 | A1 | 6/2017 | |

OTHER PUBLICATIONS

Machine Translation of JP 2003311116 (Year: 2003).*
Machine Translation of ES 2557458 (Year: 2016).*
Machine Translation of DE 10112802 (Year: 2002).*
National Search Report EP 21 701 332.5 dated Nov. 28, 2024.
National Search Report CN 202180014398.2 dated Apr. 17, 2024.
International Search Report PCT/EP2021/051829 dated Apr. 28, 2021.

* cited by examiner

FUME EXTRACTION DEVICE, SYSTEM FOR INSTALLATION, AND ASSEMBLY KIT FOR A FUME EXTRACTION

CROSS-REFERENCES TO RELATED APPLICATIONS

This application is the U.S. National Stage of International Application No. PCT/EP2021/051829, filed Jan. 27, 2021, which designated the United States and has been published as International Publication No. WO 2021/160431 A1 and which claims the priority of European Patent Application, Ser. No. 20/290,012.2, filed Feb. 14, 2020, pursuant to 35 U.S.C. 119(a)-(d).

The contents of International Application No. PCT/EP2021/051829 and European Patent Application, Serial No. 20290012.2 are incorporated herein by reference in their entireties as if fully set forth herein.

BACKGROUND OF THE INVENTION

The present invention relates to a fume extraction device and to a system for installation and to an assembly kit for assembling such a fume extraction device.

It is known to introduce a fume extraction device into a worktop. In this regard the fume extraction device can be adjacent to a hob or integrated into a hob. With these fume extraction devices, vapor and waste steam produced during the cooking process, for instance, are taken into or adjacent to the hob by way of a cut-out. The vapor and waste steam are cleaned through filters and output again as cleaned air through an air outlet opening in the fume extraction device.

Such fume extraction devices can represent an air recirculation system. A fume extraction device referred to as an air recirculation system is one in which the air leaving the air outlet opening can be released back into the room in which the fume extraction device is operated, in particular the kitchen.

Alternatively, it is known to operate such fume extraction devices as an exhaust air unit. In this case, the air escaping the air outlet opening of the fume extraction device is released into the environment, for instance through a wall box in a room wall, by way of an exhaust air duct.

It is known to use odor filters for air recirculation systems. In particular, active carbon filters are used in order to rid the air of odorous substances before these are guided back into the room.

If such an air recirculation system is connected to an exhaust air duct, this is disadvantageous for a number of reasons. In particular, the filter material or the functionality of the odor filter are consumed or reduced over time, without being beneficial to the user.

BRIEF SUMMARY OF THE INVENTION

It is therefore the object of the present invention to create a solution, by means of which a fume extraction device can be efficiently converted into an exhaust air unit and can be operated in exhaust air mode.

According to a first aspect, the object is achieved by a fume extraction device with a connected air duct, wherein the fume extraction device is embodied for installation in an item of kitchen furniture, and the fume extraction device comprises an air inlet opening, which is disposed in the top side of the fume extraction device, and an appliance housing, which is arranged below the air inlet opening, and has an air outlet opening in a side wall, and a fan, which is arranged in the appliance housing. The fume extraction device is characterized in that the fume extraction device comprises at least one noise filter element, which is received in the appliance housing and the filter material of which is chemically inert.

The fume extraction device preferably represents a fume extraction device integrated into a hob. The fume extraction device has an appliance housing. The fan of the fume extraction device, which can also be referred to as ventilator, is arranged in the appliance housing. The fume extraction device has an air inlet opening which is disposed in the top side of the fume extraction device. With a fume extraction device integrated into a hob, the air inlet opening can be formed by a cut-out in the cover plate of the hob. With a fume extraction device which is separate from the hob, the air inlet opening can be formed by a recess in the top side, in particular worktop, of the item of kitchen furniture, in which the fume extraction device is installed. These types of air inlet opening exist in embodiments of the appliance housing which is upwardly open. If the appliance housing is upwardly closed, the air inlet opening is therefore introduced into the top side of the appliance housing. In this case, the air inlet opening is aligned with a cut-out in a cover plate of the hob or a recess of a worktop. While the air inlet opening is disposed in the top side of the fume extraction device, air can be taken in downwards into the fume extraction device by way of this air inlet opening. The appliance housing, in which the fan is preferably received in the fan housing, is disposed below the air inlet opening. In this regard, in the vertical top view onto the air inlet opening, the air inlet opening of the fan housing can be disposed in the air inlet opening or horizontally offset from it.

The appliance housing has at least one air outlet opening. The air outlet opening is arranged in a side wall of the appliance housing. The air outlet opening is preferably arranged in the rear wall of the appliance housing, which, after installing the fume extraction device, which can also be referred to as assembly, is facing a room wall which is behind the item of kitchen furniture. The air outlet opening of the appliance housing can be aligned with the air outlet of the fan housing. The air outlet preferably is disposed in the air outlet opening.

In the appliance housing, with a fume extraction device integrated in a hob, the heating modules of the hob are preferably also received. The air outlet opening is used to let out or vent cleaned air from the fume extraction device. The item of kitchen furniture, which can also be referred to as piece of furniture, in which the fume extraction device is installed, preferably represents a kitchen floor unit. The kitchen floor unit is preferably standing against a room wall and has no rear wall.

The air duct which is connected to the fume extraction device represents an air guide. The air duct preferably represents an exhaust air duct, by way of which the air duct the air leaving the air outlet opening can be routed to an air outlet end of the air duct which is at a distance from the fume extraction device. After assembly for the exhaust air mode, the air outlet end of the air duct is preferably disposed in a room wall or house wall, and can be connected to a wall box, for instance.

The fume extraction device is characterized in that the fume extraction device has at least one noise filter element which is received in the appliance housing and the filter material of which is chemically inert.

A filter element, by means of which noises can be reduced, is referred to as a noise filter element. In particular, noises can be damped by the noise filter element. The noise filter element can also be used for noise attenuation, however. The noise filter element can therefore also be referred to as sound absorber. In this regard, noise damping is understood to mean in particular the conversion of the noise energy into oscillation waves, which are in an inaudible range. Attenuation is understood to mean in particular the prevention of the propagation of sound waves in adjoining rooms by means of reflection. The noise filter element is received in the appliance housing, in other words is arranged herein.

The filter material of the noise filter element is chemically inert, in accordance with the invention. In accordance with the invention, chemically inert refers to a material which does not react or only reacts to a negligible degree with the air flow which is taken into the appliance housing. In particular, the filter material neither reacts with the air and the gaseous impurities of the air flow contained therein nor with particles which are contained in the air flow. Conversely hereto, with an odor filter, in particular active carbon filter, the filter material, in particular the active carbon, reacts chemically at least with the gaseous impurities in an air flow passing the same. The noise filter element can preferably be referred to as active carbonless.

By the fume extraction device having a noise filter element, it is possible to prevent the user of the fume extraction device from being disturbed by noises which develop in the fume extraction device. In particular, noises which develop during operation of the fan can be damped and/or attenuated. By the noise filter element being arranged in the appliance housing, in which the fan is also arranged, the noise reduction can take place in close proximity to the source and a transfer of noise to other components can thus be prevented, which would be the case with a noise filter element arranged downstream of the appliance housing. By the filter material of the noise filter element further being chemically inert, this does not change its chemical properties during operation and there is therefore no reduction in the functionality of the filter material or consumption of the filter material. No resources are therefore wasted.

According to one embodiment, the filter material of the noise filter element consists of plastic, in particular polyethylene terephthalate, PET. This material is advantageous since this can be easily brought into the desired shape. On the one hand, the manufacture of the noise filter element is therefore simplified and on the other hand the function of the noise filter element can be reliably achieved by setting the shape in a targeted manner.

According to one embodiment, the filter material is present as a granular material, in particular as a granulate. Alternatively or in addition, the filter material can also exist as a nonwoven fabric. If granular filter material, in particular granulate, is used as filter material, this can be present introduced into a sleeve in the noise filter element. For instance, a nonwoven fabric sleeve can surround a layer made from granulate. Alternatively, the granular filter material can however also be held between grids. The filter material can alternatively consist exclusively of layers of nonwoven fabric. The granulate and/or nonwoven fabric preferably consists of PET. By using granular filter material, the number of discontinuities in the noise filter element may be high and the propagation of noises thus prevented by means of reflection. Also with a nonwoven fabric material, the number of discontinuities is high.

According to a preferred embodiment, the noise filter element has at least one pleated mat, which consists at least partially of filter material. The mat can consist exclusively of filter material. Alternatively, the mat can have a coating or a cover layer on its surfaces. This coating or cover layer can consist of a different material to the filter material. The mat is preferably pleated. Pleated refers to a mat which is folded at least in regions and preferably completely. In order to stabilize the pleated shape of the mat, the mat can be surrounded at least in regions by a frame. In particular, at least the edges of the mat which are at right angles to the longitudinal extension of the folds can be covered with a frame. It is also possible, however, for all edges of the pleated mat to be covered by a frame. Here the frame surrounds the pleated mat on all sides. The frame can consist of the same material as the filter material. In particular, the frame can consist of PET.

By using a pleated mat consisting of filter material, the filter surface available can be optimized with predetermined external dimensions of the noise filter element. In particular, a mat with a surface of 0.1 $m^2$ can be introduced into a frame which has a length of 194 mm, a width of 75 mm and a height of 34 mm, for instance. To this end, 24 folds can be produced in the mat, for instance. Since with a pleated mat the thickness of the mat itself can moreover be minimal, a relatively small differential pressure is achieved with the noise filter element. For instance, a differential pressure of ≤50 Pa can exist with a conveying volume of 150 $m^3$/h. On account of this low differential pressure, the fan can be operated with a low power so that the noise development is reduced.

According to one embodiment, the noise filter element in the flow direction is disposed downstream of the air inlet opening of the fume extraction device and upstream of the fume extraction device. On account of this arrangement of the noise filter element, this can reduce the transmission of noise by way of the air inlet opening. According to one embodiment, the at least one noise filter element can be arranged behind a grease filter element in the flow direction . For instance, one or more grease filter elements can be combined in a filter unit. According to one embodiment, for instance, two filter elements are arranged in a V-shape constellation with one another and held in a shared support. In this embodiment the noise filter elements can be arranged on the exterior of the grease filter element, for instance. The noise filter elements can be received and held in a filter receptacle, which can represent a rail or a frame which is completely open on one side.

According to one embodiment, the fume extraction device comprises at least two noise filter elements. In this regard, each of the noise filter elements preferably has a length which is less than the length of the air inlet opening of the fume extraction device. The at least two noise filter elements are preferably against one another on their end faces and the entire length of the combined noise filter element unit is greater than the length of the air inlet opening. In this embodiment, the air inlet opening preferably has a rectangular shape. The noise filter elements each represent a cuboid, which has a length which is greater than the width. With a noise filter element with a pleated mat, the dimension which is parallel to the fold is preferably referred to as width and the dimension which is at right angles to the fold is referred to as length. By the combined noise filter element unit being formed from two noise filter elements, despite the overall length which is greater than the length of the air inlet opening, the combined unit can be introduced through the air inlet opening into the fume extraction device and also removed herethrough. The air inlet opening preferably extends in the depth direction of the fume extraction device and in particular of the hob. The noise filter element can preferably have a strap which is fastened to one of the end walls of the noise filter element or two straps which are fastened to the opposite end faces of the noise filter element. The noise filter element can be better managed by way of these straps, in particular aligned in the fume extraction device and removed from the fume extraction device.

According to one embodiment, the air duct has at least one duct element. If the air duct has a number of duct elements, this can be produced by connecting the duct elements.

The air duct preferably has a straight duct element, which is introduced partially into the air outlet opening of the appliance housing. The size and shape of the cross-section of the duct element therefore corresponds to the size and shape of the cross-section of the air outlet opening of the appliance housing. The size of the cross-section of the duct element is preferably smaller than the size of the cross-section of the air outlet opening. This produces a gap between the outer periphery of the duct element and inner periphery of the air outlet opening. In this regard a sealing strip is particularly preferably attached to the outer periphery of the duct element, by means of which the gap is sealed.

The straight duct element can be piece of pipe and have a rectangular cross-section, for instance. The end of the straight duct element, which faces the end with which this is introduced into the air outlet opening, is also referred to as free end of the duct element. This free end can be introduced into an opening in the room wall, which is behind the fume extraction device. The free end is preferably connected to a wall box.

In addition to a straight duct element, the air duct can have at least one curved duct element. By there being at least one straight and at least one curved duct element, a possible vertical or horizontal offset of the opening in the room wall with respect to the air outlet opening of the appliance housing can be bridged.

With the embodiment of the air duct which is connected to a room wall or a house wall, the fume extraction device represents an exhaust air unit. Since the air is released from the air duct into the environment possibly by way of a wall box, an odor filter, as required with a recirculation air unit, is not needed.

According to a further aspect, the invention relates to a system for installing a fume extraction device in an item of kitchen furniture, wherein the system has a fume extraction device with an air inlet opening, which is disposed in the top side of the fume extraction device, and an appliance housing, which is arranged below the air inlet opening and in a side wall has an air outlet opening, and a fan, which is arranged in the appliance housing. The system is characterized in that the fume extraction device has an interface for an air duct which is to be connected detachably and which is formed at the air outlet opening, and at least one filter receptacle for a filter element, which is arranged downstream of the air inlet opening and upstream of the fan in the flow direction, and the system further comprises an air duct and at least one filter element. The filter receptacle can also be referred to as filter holder.

Advantages and features which are described with respect to the inventive fume extraction device apply, if applicable, also to the inventive system and the inventive assembly kit and in each case vice versa. The assembly kit is described in more detail below.

A series of advantages is achieved by the system which has a fume extraction device with an interface for an air duct which is to be connected detachably and at least one filter receptacle for detachably receiving at least one filter element. On the one hand, both the at least one filter element and also the air duct can be detached from the filter receptacle or the interface and thus from the fume extraction device and replaced. This is not only advantageous for cleaning the filter elements or maintenance of the air duct. Instead, on account of this modular design, it is possible to operate a fume extraction device without structural changes to the fume extraction device itself, in particular the appliance housing, either in exhaust air mode or in air recirculation mode.

According to one embodiment, the system therefore comprises an air duct which consists of a duct element, for insertion into the interface of the fume extraction device, and at least one noise filter element for introduction into the at least one filter receptacle. The interface for the air duct is formed by the air outlet opening of the appliance housing. The end of the duct element which is to be inserted into the air outlet opening therefore preferably has a cross-section, the size and shape of which corresponds to the size and shape of the air outlet opening and is preferably marginally smaller. The gap between the air outlet opening and the duct element is sealed here in accordance with the invention by a sealing strip which is also referred to as sealing ring. The at least one noise filter element has such a size and shape that this is introduced at least in regions into the filter receptacle of the fume extraction device and can be held there. At least two noise filter elements can preferably be introduced into a shared filter receptacle. In particular, the two noise filter elements can rest against one another with their end faces facing one another.

If the fume extraction device is equipped so that this forms an air recirculation unit, wherein an air duct for air recirculation mode is introduced into the interface and one or more odor filter elements are provided in the filter receptacle, with the present invention this state can be easily changed by the user so that the fume extraction device is moved into an exhaust air state. To this end, it is merely necessary for the odor filter element or elements to be removed and for the noise filter element or elements to be introduced into the filter receptacle and for the air duct to be replaced. In particular, a duct element of an air recirculation duct, in other words an air duct, the free end of which points into the room in which the fume extraction device is operated and which was introduced into the air outlet opening, can be removed herefrom and an exhaust air duct, in particular a straight duct element can instead be introduced into the air outlet opening and connected to an opening in the room wall.

According to a further aspect, the present invention therefore relates to an assembly kit for a fume extraction device of an inventive installation system, wherein the assembly kit is characterized in that the assembly kit comprises an air duct, which consists of a duct element, and at least one noise filter element. With such an assembly kit, a user can easily retrofit a fume extraction device equipped as an air recirculation device into a fume extraction device for an exhaust air mode.

Directional statements such as front, back, top and bottom, relate, unless specified otherwise, to a fume extraction device and its parts in the state in which they are introduced into the piece of furniture.

BRIEF DESCRIPTION OF THE DRAWINGS

The invention is described again below with reference to the accompanying drawings, in which.

DETAILED DESCRIPTION OF EXEMPLARY EMBODIMENTS OF THE PRESENT INVENTION

Figure 1:
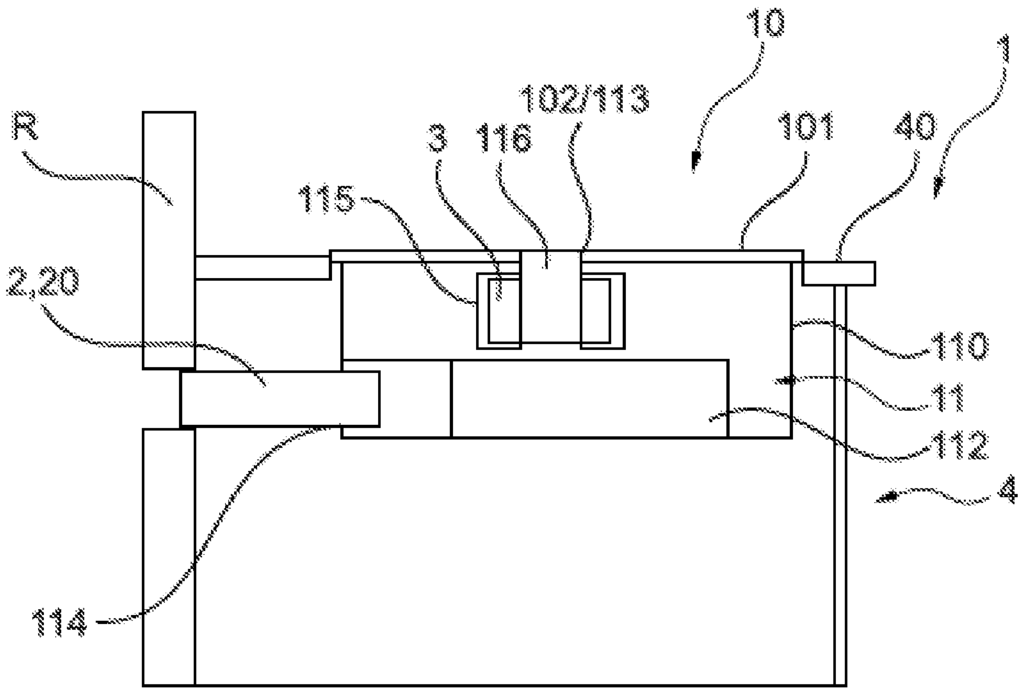
FIG. 1: shows a schematic block diagram of an embodiment of the inventive fume extraction device in the assembled state for the exhaust air mode.

FIG. 1 shows a schematic block diagram of an embodiment of the fume extraction device 11. In this embodiment the fume extraction device 1 is integrated into a hob 10. The hob 10 and the fume extraction device 11 together are also referred to below as combination unit 1. The combination unit 1 is integrated into a piece of kitchen furniture 4, which is also referred to as kitchen cabinet 4. The kitchen cabinet 4 has a worktop 40 on the topside, which upwardly delimits the interior of the kitchen cabinet 4. The interior of the kitchen cabinet 4 is delimited on the sides by side walls, of which only one is visible in FIG. 1. In the embodiment shown, the interior of the kitchen cabinet 4 is open to the rear.

The combination device 1 consists of a hob 10 and a fume extraction device 11 integrated therein. The hob 10 has a cover plate 101. A hob housing with heating modules (not shown) arranged therein can be arranged below the cover plate 101. In the cover plate 101, a cut-out 102 is provided in the central region of the cover plate 101, which has a rectangular shape.

The fume extraction device 11 comprises a fume extraction housing 110 and an air duct 2. The fume extraction housing 110 of the fume extraction device 11 is arranged below the hob 10. The fan housing 112 for a fan (not shown) is formed in the fume extraction housing 110. The fan is preferably a radial fan. The fan housing 112 is designed so that the fan axis of the fan is vertical. This is shown in FIG. 1 by the dashed line. An air inlet opening (not shown) is introduced in the top side of the fume extraction housing 110 and in particular the fan housing 112, which faces the lower side of the hob 10 and rests against it in regions. Air can enter the fan housing 112 from the top by way of the air inlet opening.

For improved visibility of the components of the fume extraction device 1 in FIG. 1, the cut-out 102 is shown in the width direction of the cover plate 101 of the hob 10. The cut-out 102 preferably, however, extends in the depth direction of the cover plate 101 (see FIGS. 2 and 3).

In the embodiment shown the air inlet opening 113 of the fume extraction device 11 is formed by the cut-out 102 of the cover plate 101 of the hob 10. A grease filter unit 116 is introduced into the air inlet opening 113 or the cut-out 102. Grease filter elements (not shown) are provided on the sides of the grease filter unit 116. Noise filter elements 3 are arranged outwardly offset in respect of the grease filter unit 116, which, in the embodiment shown, lie parallel to the grease filters and are held in each case in a filter receptacle 115. In the embodiment shown, the filter receptacle 115 is formed by a frame, which is open toward the filter receptacle 115, through which air can pass. In the embodiment shown, the filter receptacle 115 and the noise filter element 3 provided therein can be passed through in the horizontal direction.

The appliance housing 110 has an air outlet opening 114, which, in the embodiment shown, is formed by an air outlet of the fan housing 112, and which is disposed in the rear side of the fume extraction device 11.

The air duct 2 is connected to the air outlet opening 114. In the embodiment shown in FIG. 1, the air duct 2 consists of a duct element 20 which represents a straight duct element 20. The free end of the air duct 2 is introduced into an opening in the room wall R.

Figure 2:
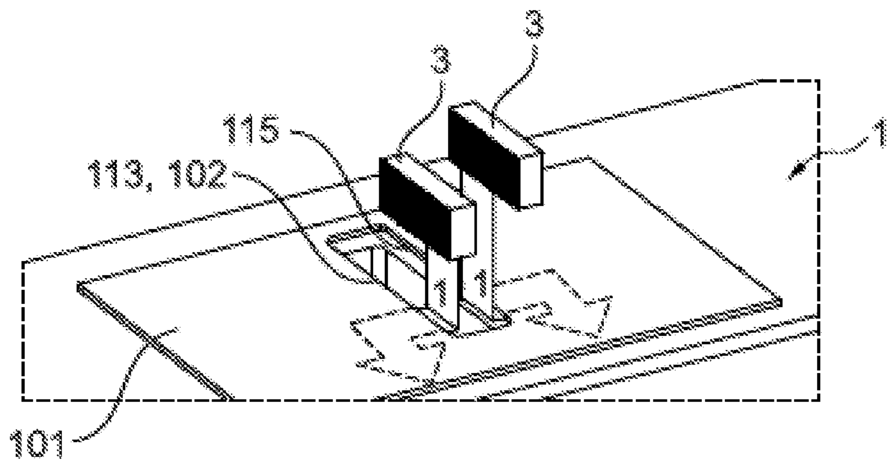
FIG. 2: shows a schematic perspective view of the embodiment according to FIG. 1 during assembly.
Figure 3:
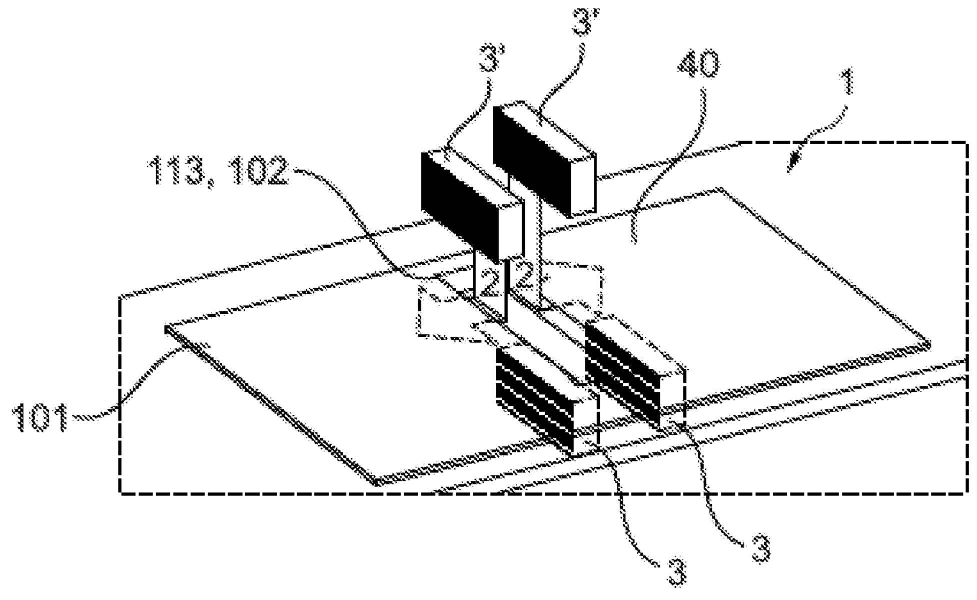
FIG. 3: shows a further schematic perspective view of the embodiment according to FIG. 1 during assembly.

FIGS. 2 and 3 show the fume extraction device 11 according to FIG. 1 in a perspective view. Contrary to FIG. 1, the alignment of the cut-out 102 is shown here in the depth direction of the cover plate 101 of the hob 10. This is the preferred alignment of the cut-out 102. The further elements, grease filter unit (not shown in FIG. 2), filter receptacle 115 and noise filter elements 3, therefore also extend in the depth direction.

FIGS. 2 and 3 show steps of the assembly of the fume extraction device 11. In particular, the introduction of the noise filter elements 3, 3' is shown in FIGS. 2 and 3. With the embodiment shown, two noise filter elements 3, 3' are provided for each filter receptacle 115. The noise filter elements 3 and 3' here have an identical design.

Figure 5:
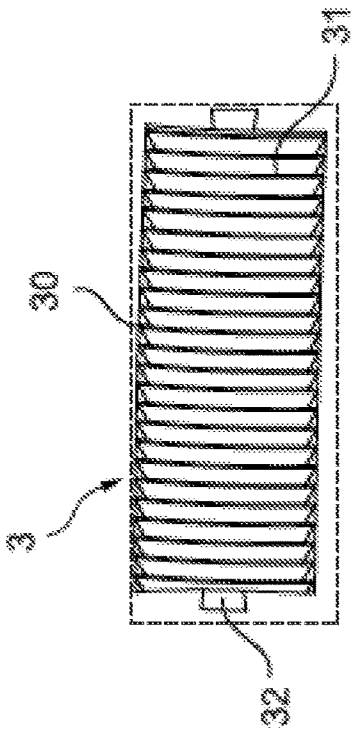
FIG. 5: shows a schematic front view of the embodiment of the noise filter element according to FIG. 4.
Figure 4:
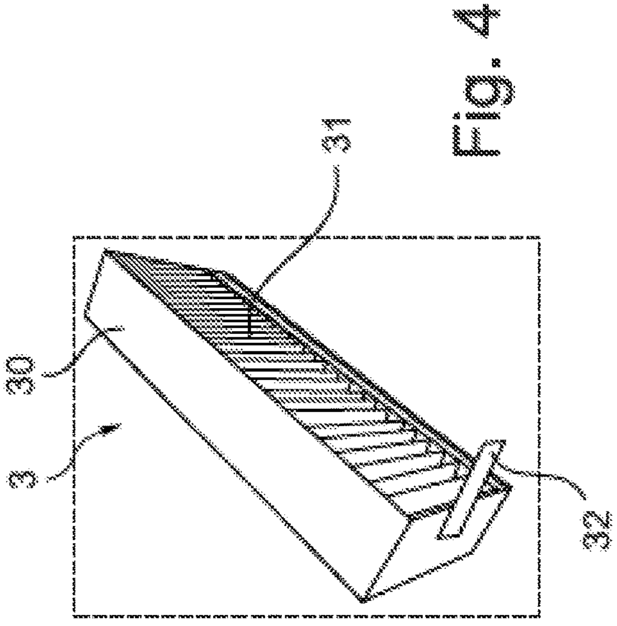
FIG. 4: shows a schematic perspective of an embodiment of a noise filter element.

For instance, the noise filter element 3, 3' can have the design shown in FIGS. 4 and 5. Here each noise filter element 3 has a cuboid shape. The noise filter element 3 has in particular a frame 31, in which a pleated mat 31 made from filter material, in particular PTE is held. The noise filter element 3 has a length which is greater than the width of the noise filter element 3. The dimension in the direction in which the noise filter element 3 can be passed through is referred to as the depth of the noise filter element 3. In FIG. 5, the depth of the noise filter element is therefore the dimension which is directed into the image plane.

The noise filter element 3 has a strap 32, in each case, on the side walls which are also referred to as end walls. The straps 32 project beyond the frame 31.

As FIG. 2 shows, in a first step two noise filter elements 3, which in the assembled state represent the front noise filter elements 3, are introduced through the cut-out 102 in the cover plate 101 into the interior of the fume extraction device 11. The noise filter elements 3 are aligned here so that their lengths are in the longitudinal direction of the cut-out 102. Once below the cut-out 102, the left noise filter element 3 is moved to the left and the right noise filter element 3 is moved to the right. In this way the noise filter elements 3 are introduced into the filter receptacles 115. The noise filter elements 3 are then moved forward into the filter receptacles 115. These movements are indicated in FIG. 2 by block arrows. With the front noise filter elements 3, in the position positioned in the front region of the filter receptacles 115, two further noise filter elements 3' are then introduced into the fume extraction device 11 through the cut-out 102. Since these noise filter elements 3' are moved through the cut-out 102 into the interior of the fume extraction device 11, these are moved outwards, as indicated schematically in FIG. 3 by the block arrows.

In the assembled state, two noise filter elements 3, 3' are therefore disposed in each of the filter receptacles 115. Here the noise filter elements 3, 3' rest against one another with an endface. The straps 32 (not visible in FIGS. 2 and 3) project here in the direction of the center of the cut-out 102 beyond the noise filter elements 3, 3'. In this way, the straps 32 can also be accessed by the user after introducing the noise filter elements 3, 3' into the filter receptacle 155 by engaging in the cut-out 102 and the noise filter elements 3, 3' can be removed from the filter receptacle 115.

Figure 7:
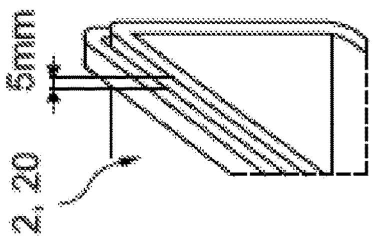
FIG. 7: shows a schematic detailed view of an edge of the duct element of the assembly kit according to FIG. 7.
Figure 6:
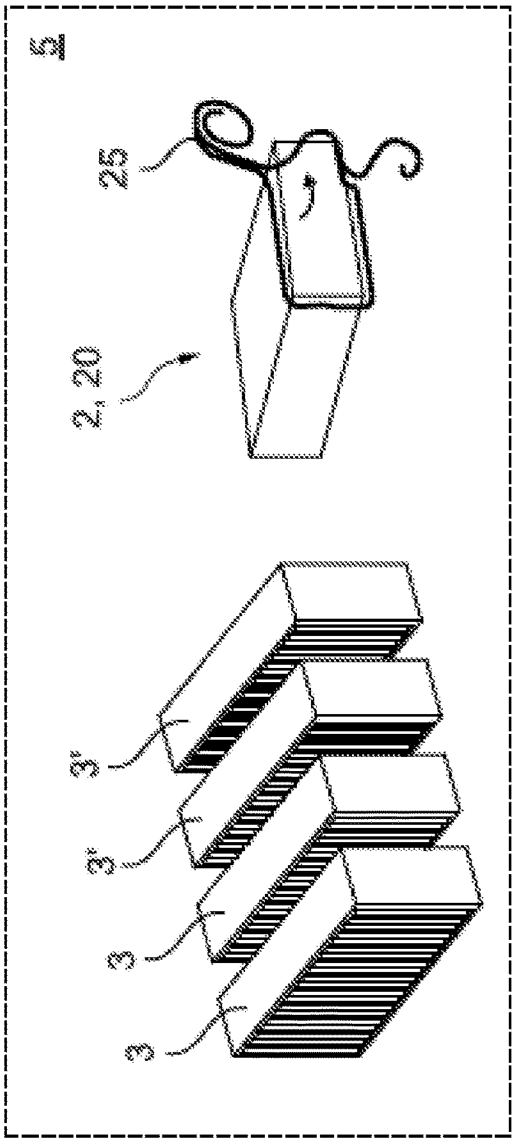
FIG. 6: shows an embodiment of an inventive assembly kit.

FIG. 6 shows an embodiment of an assembly kit 5, which can be provided for a fume extraction device 11. The assembly kit 5 here comprises four noise filter elements 3, 3' and an air duct 2 in the form of a straight duct element 20. A sealing strip 25, which runs around the outer periphery of the duct element 20 and is adhered hereto, is shown at one end of the duct element 20. This is shown schematically in FIG. 6. After attachment, the sealing strip 25 is preferably disposed at a distance, for instance 5 mm, from the end of the duct element 20. This is shown in FIG. 7.

Figure 8:
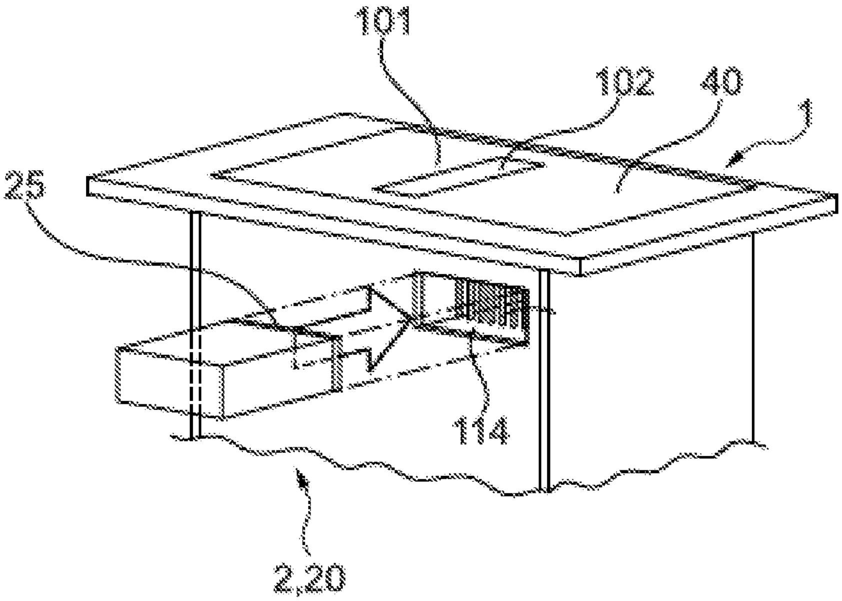
FIG. 8: shows a schematic, perspective rear view of an embodiment of the inventive fume extraction device during the installation.

FIG. 8 shows the rear view of the fume extraction device 1 according to FIGS. 1 to 3. The air outlet opening 114 can be seen in the rear side of the fume extraction device 11. The duct element 20 with the sealing strip 25 is inserted into this air outlet opening 114. This is shown in FIG. 8 by the block arrow.

As described above, with the present invention a fume extraction device 11, which is equipped for the air recirculation mode, can be easily equipped for the exhaust air mode.

Figure 9:
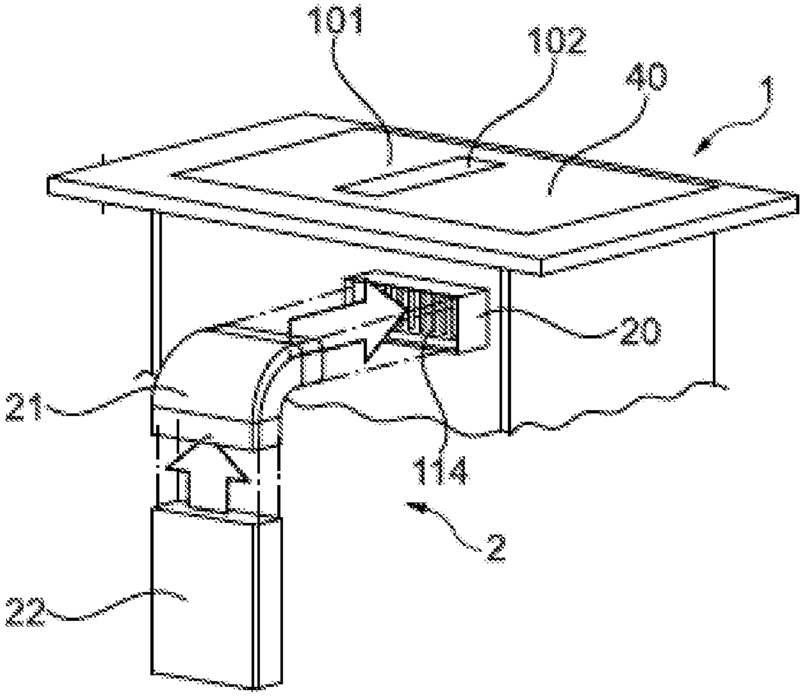
FIG. 9: shows a schematic, perspective rear view of an embodiment of a fume extraction device for the air recirculation mode during the installation.
Figure 10:
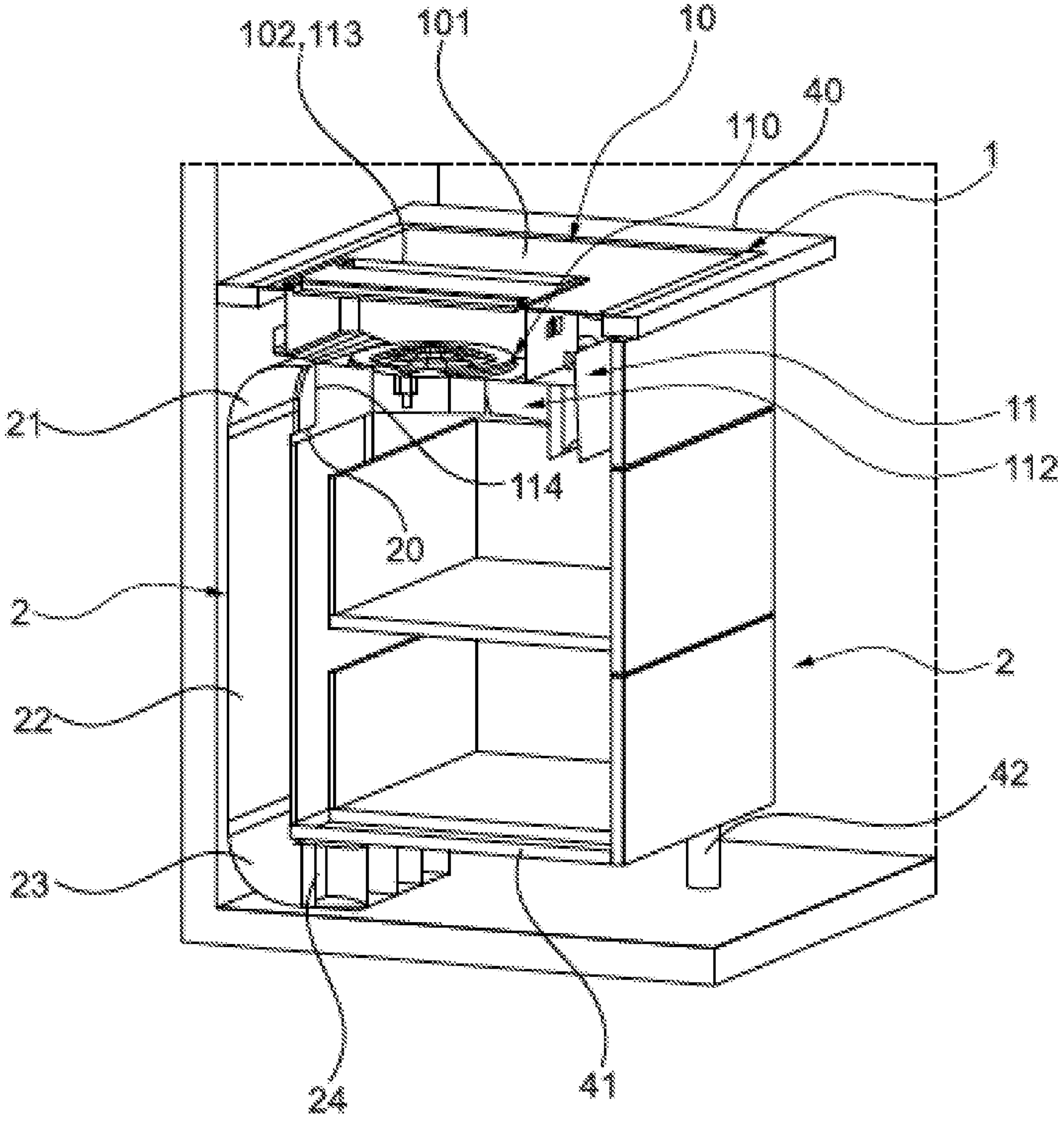
FIG. 10: shows a schematic, perspective sectional view of a fume extraction device for the air recirculation mode.

FIGS. 9 and 10 show a fume extraction device 11 which is equipped for the air recirculation mode. The fume extraction device 11 for the air recirculation mode differs from the inventive or inventively achievable fume extraction device 11 for the exhaust air mode in that the air duct 2 has a different shape and that odor filter elements (not visible) are introduced into the filter supports instead of the noise filter elements.

The air duct 2 for the air recirculation mode can be seen in FIGS. 9 and 10. This consists of a flat duct element 20, which is introduced into the air outlet opening 114 of the fume extraction device 11. Moreover, the air duct 2 has a first curved duct element 21, which can also be referred to as entrance curve of the air duct 2. The air flow can be deflected from the horizontal into the vertical by way of this curved duct element 21. A further duct element 22, which represents a straight duct element, connects with the entrance curve. Therefore air extends from the entrance curve into the vertical part of the air duct 2. A further curved duct element 23, which can also be referred to as exit curve, connects to the vertical part. Air therefore extends from the vertical part into the exit curve, in which the air flow is deflected forward from the vertical into the horizontal. The air extends from the entrance curve into a diffusor 24. Therefore in the air recirculation mode of the fume extraction device 11, the air can therefore be output in the plinth air gap between a base 41 of the kitchen cabinet 41 and the kitchen floor by way of the diffusor 24. The plinth air gap is produced by the feet 42 of the kitchen cabinet 4.

Such a fume extraction device for the air recirculation mode can be easily converted into a fume extraction device for the exhaust air mode by using the inventive assembly kit, without structural measures having to be performed on the fume extraction device itself, in particular the appliance housing.

The invention claimed is:

1. A fume extraction device for installation in an item of kitchen furniture, wherein the fume extraction device is convertible between an exhaust air mode and a recirculation air mode, said fume extraction device comprising:
- a top side provided with an air inlet opening;
- an appliance housing arranged below the air inlet opening and having a side wall provided with an air outlet opening having an interface for connection to an exhaust air duct when the fume extraction device is converted to the exhaust air mode and to a recirculation duct when the fume extraction device is converted to the recirculation air mode;
- a fan arranged in the appliance housing;
- a filter receptacle arranged in a flow direction downstream of the air inlet opening and upstream of the fan,
  - wherein the filter receptacle is configured to releasably receive and hold one or more noise filter elements inserted into the filter receptacle through the air inlet opening when the fume extraction device is converted into the exhaust air mode, the one or more noise filter elements configured to reduce a transmission of noise by way of the air inlet opening when the fume extraction device is converted into the exhaust air mode and including a filter material which is chemically inert, and
  - wherein the filter receptacle is configured to releasably receive and hold one or more odor filter elements when the fume extraction device is converted into the recirculation air mode; and
- one or more grease filter elements releasably received in the filter receptacle with the one or more noise filter elements through the air inlet opening when the fume extraction device is converted into the exhaust air mode and releasably received in the filter receptacle with the one or more odor filter elements when the fume extraction device is converted into the recirculation air mode,
- wherein the filter receptacle is configured to releasably receive and hold the one or more noise filter elements one of:
  - arranged behind the grease filter element in a flow direction downstream of the air inlet opening, or
  - arranged on an exterior of the grease filter element with respect to a flow direction downstream of the air inlet opening.

2. The fume extraction device of claim 1, wherein the filter material of the one or more noise filter elements is made of plastic.

3. The fume extraction device of claim 2, wherein the plastic is polyethylene terephthalate PET.

4. The fume extraction device of claim 1, wherein the filter material is present as a granulate and/or as a nonwoven fabric.

5. The fume extraction device of claim 1, wherein the one or more noise filter elements includes a pleated mat, which is made at least partially of filter material.

6. The fume extraction device of claim 1, further comprising at least two of said one or more noise filter elements resting against one another on their end faces when the fume extraction device is converted to the exhaust air mode, each of the at least two noise filter elements having a length which is less than a length of the air inlet opening, wherein the at least two noise filter elements form a noise filter element unit of a length which is larger than the length of the air inlet opening.

7. The fume extraction device of claim 1, wherein the exhaust air duct includes a straight duct element, which is introduced partially into the air outlet opening of the appliance housing and conveys air horizontally when the fume extraction device is converted to the exhaust air mode, and wherein the exhaust air duct further includes at least one curved duct element which deflects air from a horizontal direction to a vertical direction when the fume extraction device is converted to the recirculation air mode.

8. The fume extraction device of claim 1, wherein the filter material is present as a granulate.

9. The fume extraction device of claim 8, further comprising a sleeve comprising the granulate.

10. The fume extraction device of claim 1, wherein at least one noise filter of the one or more noise filter elements includes one or more straps extending therefrom, and wherein the one or more straps is accessible via the air inlet opening for releasing and removing the at least one noise filter from the filter receptacle and through the air inlet opening when the fume extraction device is converted from the exhaust air mode into the recirculation air mode.

11. The fume extraction device of claim 1, wherein the filter receptacle is configured to releasably receive and hold at least two of the one or more noise filter elements such that a first noise filter element and a second noise filter element of the at least two noise filter elements are arranged outwardly offset with respect to the grease filter unit when the fume extraction device is converted into the exhaust air mode, with the grease filter unit disposed between the first noise filter element and the second noise filter element, wherein the flow direction from the grease filter element exits from opposite sides of the grease filter element and passes through each of the first noise filter element and the second noise filter element in opposite horizontal directions, and wherein the first noise filter element and the second noise filter element are arranged parallel to the grease filter unit or in a V-shape constellation with respect to the grease filter unit.

12. The fume extraction device of claim 11, wherein each of the at least two of the one or more noise filter elements includes a cuboid shape and one or more straps extending therefrom, and wherein the one or more straps is accessible via the air inlet opening for releasing and removing each of the at least two of the one or more noise filter elements from the filter receptacle and through the air inlet opening when the fume extraction device is converted from the exhaust air mode into the recirculation air mode.

13. The fume extraction device of claim 11, wherein the filter receptacle is configured to releasably receive and hold at least four of the one or more noise filter elements such that the first noise filter element and a third noise filter element are arranged outwardly offset with respect to the grease filter unit on a first side of the grease filter unit when the fume extraction device is converted into the exhaust air mode, and the second noise filter element and a fourth noise filter element are arranged outwardly offset with respect to the grease filter unit on a second side of the grease filter unit when the fume extraction device is converted into the exhaust air mode, with the grease filter unit disposed between each of the first noise filter element and the second noise filter element, and between the third noise filter element and the fourth noise filter element, wherein the flow direction from the grease filter element exits from opposite sides of the grease filter element and passes, on the first side, through each of the first noise filter element and the third noise filter element, and on the second side, through each of the second noise filter element and the fourth noise filter element, in opposite horizontal directions from the grease filter element.

14. The fume extraction device of claim 13, wherein the first noise filter element and the third noise filter element rest against one another on their end faces when the fume extraction device is converted to the exhaust air mode, and the second noise filter element and the fourth noise filter element rest against one another on their end faces when the fume extraction device is converted to the exhaust air mode, each of the first noise filter element, the second noise filter element, the third noise filter element, and the fourth noise filter element having a length which is less than a length of the air inlet opening, wherein the first noise filter element and the third noise filter element form a first noise filter element unit of a length which is larger than the length of the air inlet opening and the second noise filter element and the fourth noise filter element form a second noise filter element unit of a length which is larger than the length of the air inlet opening, wherein each of the first noise filter element, the second noise filter element, the third noise filter element, and the fourth noise filter element includes one or more straps extending therefrom, and the one or more straps is accessible via the air inlet opening for releasing and individually removing each of the first noise filter element, the second noise filter element, the third noise filter element, and the fourth noise filter element from the filter receptacle and through the air inlet opening when the fume extraction device is converted from the exhaust air mode into the recirculation air mode, wherein the exhaust air duct includes a straight duct element, which is introduced partially into the air outlet opening of the appliance housing and conveys air horizontally when the fume extraction device is converted to the exhaust air mode, and wherein the exhaust air duct further includes at least one curved duct element which deflects air from a horizontal direction to a vertical direction when the fume extraction device is converted to the recirculation air mode.

15. A system for installation of a fume extraction device in an item of kitchen furniture, wherein the fume extraction device is convertible between an exhaust air mode and a recirculation air mode, said system comprising:

a fume extraction device comprising a top side provided with an air inlet opening, an appliance housing arranged below the air inlet opening and having a side wall provided with an air outlet opening, and a fan arranged in the appliance housing;

an exhaust air duct detachably connected to the fume extraction device at an interface of the fume extraction device and formed at the air outlet opening;

a filter receptacle arranged in a flow direction downstream of the air inlet opening and upstream of the fan, wherein the filter receptacle is configured to releasably receive and hold one or more noise filters inserted into the filter receptacle through the air inlet opening when the fume extraction device is converted into the exhaust air mode, the one or more noise filter elements configured to reduce a transmission of noise when the fume extraction device is converted into the exhaust air mode by way of the air inlet opening and including a filter material which is chemically inert, and wherein the filter receptacle is configured to releasably receive and hold one or more odor filter elements when the fume extraction device is converted into the recirculation air mode; and one or more grease filter elements combined in the filter receptacle with the one or more noise filter elements through the air inlet opening when the fume extraction device is converted into the exhaust air mode and releasably received in the filter receptacle with the one or more odor filter elements when the fume extraction device is converted into the recirculation air mode, wherein the filter receptacle is configured to releasably receive and hold the noise filter element one of:

arranged behind the grease filter element in a flow direction downstream of the air inlet opening, or arranged on an exterior of the grease filter element with respect to a flow direction downstream of the air inlet opening.

16. The system of claim 15, wherein the exhaust air duct includes a straight duct element, which is introduced partially into the air outlet opening of the appliance housing and conveys air horizontally when the fume extraction device is converted to the exhaust air mode, and wherein the exhaust air duct further includes at least one curved duct element which deflects air from a horizontal direction to a vertical direction when the fume extraction device is converted to the recirculation air mode.

17. An assembly kit for installation of a fume extraction device in an item of kitchen furniture, wherein the fume extraction device is convertible between an exhaust air mode and a recirculation air mode, said assembly kit comprising:

an air duct including a duct element for detachable connection at an interface of the fume extraction device to an air outlet opening in a top side of the fume extraction device;

a filter receptacle arranged in a flow direction downstream of the air inlet opening of the fume extraction device and upstream of a fan of the fume extraction device, wherein the filter receptacle is configured to releasably receive and hold one or more noise filter elements inserted into the filter receptacle through the air inlet opening when the fume extraction device is converted into the exhaust air mode, the one or more noise filter elements configured to reduce a transmission of noise by way of the air inlet opening when the fume extraction device is converted into the exhaust air mode and including a filter material which is chemically inert, and wherein the filter receptacle is configured to releasably receive and hold one or more odor filter elements when the fume extraction device is converted into the recirculation air mode;

wherein the air duct includes a straight duct element, which is introduced partially into the air outlet opening of the appliance housing and configured to convey air horizontally when the fume extraction device is converted to the exhaust air mode, and wherein the exhaust air duct further includes at least one curved duct element which deflects air from a horizontal direction to a vertical direction when the fume extraction device is converted to the recirculation air mode.

* * * * *